Feb. 17, 1953

J. WICKS 2,629,018

IMPULSE STORAGE AND REGENERATING POLAR DUPLEX IMPULSING TELEPHONE SYSTEM

Filed April 13, 1951

3 Sheets-Sheet 1

INVENTOR.
JOHN WICKS

BY Chas. W. Candy

ATTORNEY

Feb. 17, 1953 J. WICKS 2,629,018

IMPULSE STORAGE AND REGENERATING POLAR DUPLEX IMPULSING TELEPHONE SYSTEM

Filed April 13, 1951 3 Sheets-Sheet 2

*INVENTOR.*
JOHN WICKS

BY *[signature]*

ATTORNEY

Feb. 17, 1953

J. WICKS 2,629,018

IMPULSE STORAGE AND REGENERATING POLAR DUPLEX IMPULSING TELEPHONE SYSTEM

Filed April 13, 1951

3 Sheets-Sheet 3

INVENTOR.
JOHN WICKS

BY Chas. W. Candy

ATTORNEY

Patented Feb. 17, 1953 2,629,018

UNITED STATES PATENT OFFICE 2,629,018

IMPULSE STORAGE AND REGENERATING POLAR DUPLEX IMPULSING TELEPHONE SYSTEM

John Wicks, Biloxi, Miss., assignor to Automatic Electric Laboratories, Inc., Chicago, Ill., a corporation of Delaware Application April 13, 1951, Serial No. 220,874

15 Claims. (Cl. 179—16)

The present invention relates to automatic or semi-automatic telephone systems in general, and has for its principal object the provision of improved arrangements for intercepting, storing and regenerating received impulses and for transmitting regenerated impulses, depending upon the nature of the switching operations to be performed.

The following patents are cited as showing the state of the art pertaining to the control of automatic switches in a trunking network, through the use of a simple "mechanical impulse repeater or regenerator" for storing, regenerating and retransmitting the setting impulses over a loop circuit or "talking channel": 2,154,776, W. Saville et al., April 18, 1939; 2,211,443, R. F. Stehlik, August 13, 1940; and 2,232,189, R. Taylor et al., February 18, 1941.

An oustanding feature of improvement in the present invention over the disclosures in these patents resides in the new and novel impulses regenerating arrangement wherein the impulses are received and retransmitted over a separate "control" conductor independent of the "hold" conductor and the "talking channel," thereby clearing the talking channel.

Another feature of the present invention resides in the provision of a new and novel relay network incorporating a simple mechanical regenerating device for intercepting, storing and regenerating received impulses and for transmitting regenerated impulses of correct speed and pulse ratio, which network can be interposed between various units of an existing polar duplex impulsing telephone system without requiring changes therein.

A further feature of the present invention concerns a new and novel impulse regenerating network for polar duplex impulsing telephone systems which is automatically disconnected from the connection upon receipt of the "answer" signal and can, therefore, be either common to a group of trunk circuits or be individually associated with one trunk circuit.

Other features of the present invention pertain to the particular arrangements of the circuit elements of the system whereby the above-outlined and additional operating features thereof are attained.

The various objects and features of the present invention will be understood best by reference to the following specification in connection with the accompanying drawings which show preferred embodiments of the present invention by way of example.

Referring now to the drawings, Figure 1 is a block-type diagram of a portion of the polar duplex impulsing telephone system disclosed in the J. Wicks Patent No. 2,500,392, granted March 14, 1950, showing an application of the present invention to the mentioned polar duplex impulsing telephone system.

Figure 7 shows an impulse regenerating unit comprising a mechanical impulse regenerating device, illustrated at the right-hand end of the drawing, and a group of relays for preparing and controlling the mechanical impulse regenerating device.

Figure 8 shows a rotary selector unit which functions to connect one of the toll trunks of the polar duplex impulsing telephone system with a free one of a group of impulse regenerating units, the group of impulse regenerating units being common to all of the toll trunks of the polar duplex impulsing telephone system.

Figure 9 shows a relay connecting unit for connecting and releasing the individual impulse regenerating unit of Figure 7 which is associated with a particular one of the toll trunks of the polar duplex impulsing telephone system.

Figure 10 shows an additional group of relays which is associated with the impulse regenerating unit of Figure 7 when the transmitting of the regenerated impulses is to be delayed.

Figures 1, 2, 10:
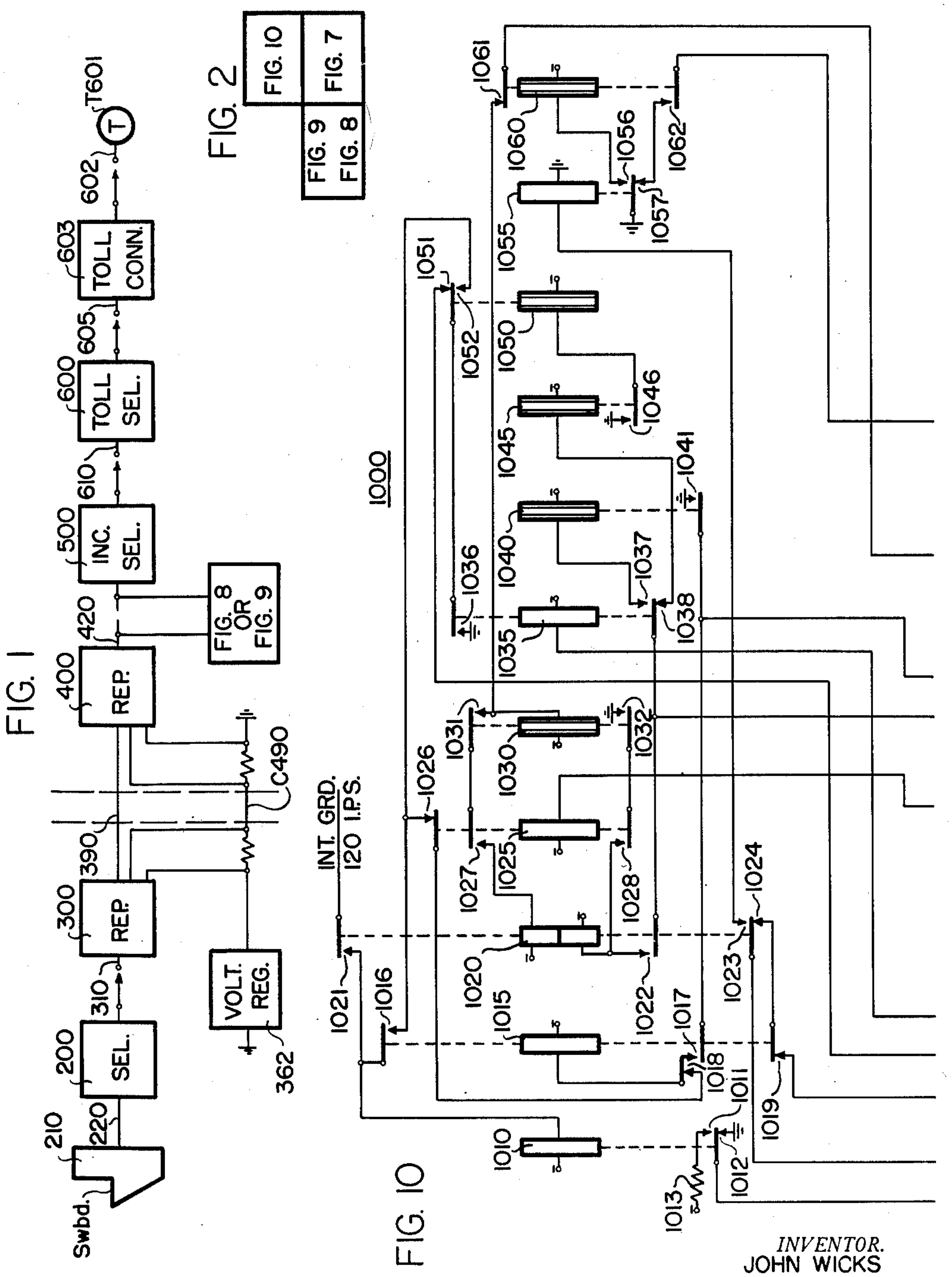
Figure 2 is a block-type diagram illustrating the method of combining Figures 7 to 10, inclusive, to form unified circuit diagrams.
Figures 7, 8, 9 and 10 show the circuit details of the present invention.

Referring more particularly to Figure 1, there is illustrated, in block form, only the elements of the polar duplex impulsing telephone system disclosed in the mentioned J. Wicks Patent No. 2,500,392 which are required for the completion of a call from the manual switchboard 210 located in one of the telephone exchanges to the telephone substation T601 located in the distant telephone exchange, the two exchanges being connected together by means of a toll trunk represented by the reference character 390. All of these elements of the polar duplex impulsing telephone system shown in Figure 1 of the patent drawings are identified by the same reference characters used in Figure 1 of Patent No. 2,500,392 for the equivalent elements and, therefore, reference can be had to the specification of Patent No. 2,500,392 for a complete description of the particular elements shown in Figure 1 of the present drawings and for an explanation of the related method of operation.

Figures 8, 9:
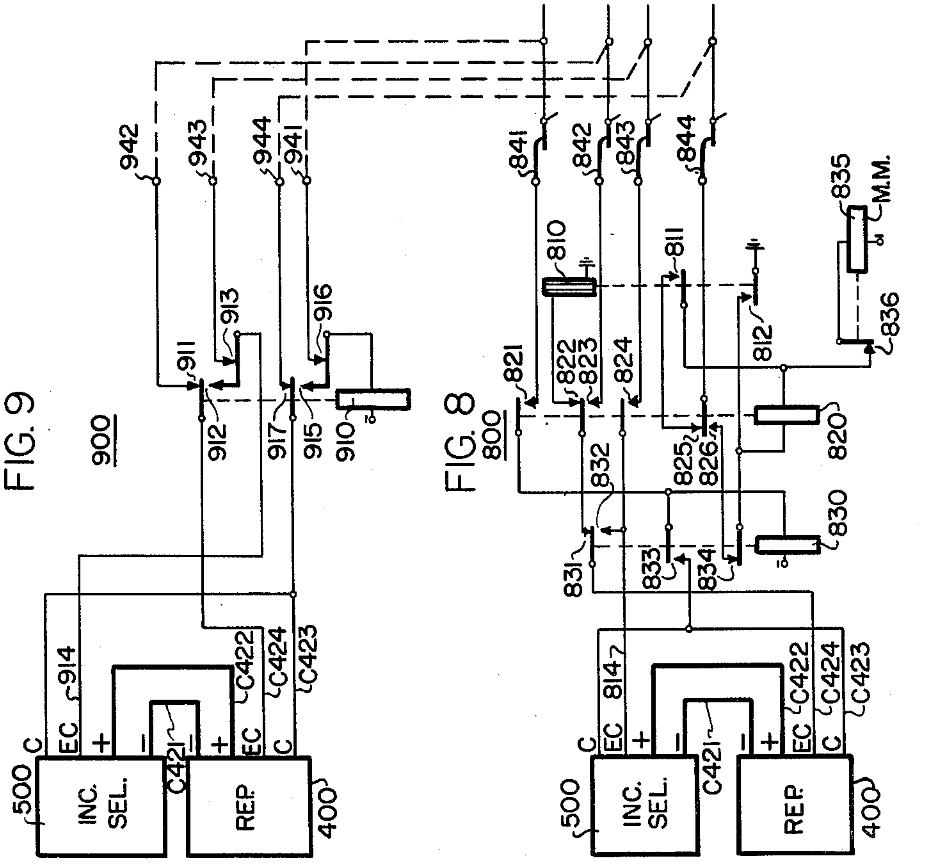

The impulse regenerating network of the present invention is applied to the polar duplex impulsing telephone system of Patent No. 2,500,392, for example, by inserting either Figure 8 or Figure 9 of the present drawings between repeater 400 and incoming selector 500 of the polar duplex impulsing telephone system, in the manner shown in Figure 1 of the present drawings. It should be understood, however, that either Figure 8 or Figure 9 of the present drawings can be inserted between other units of the polar duplex impulsing telephone system equally as well.

Figure 7:
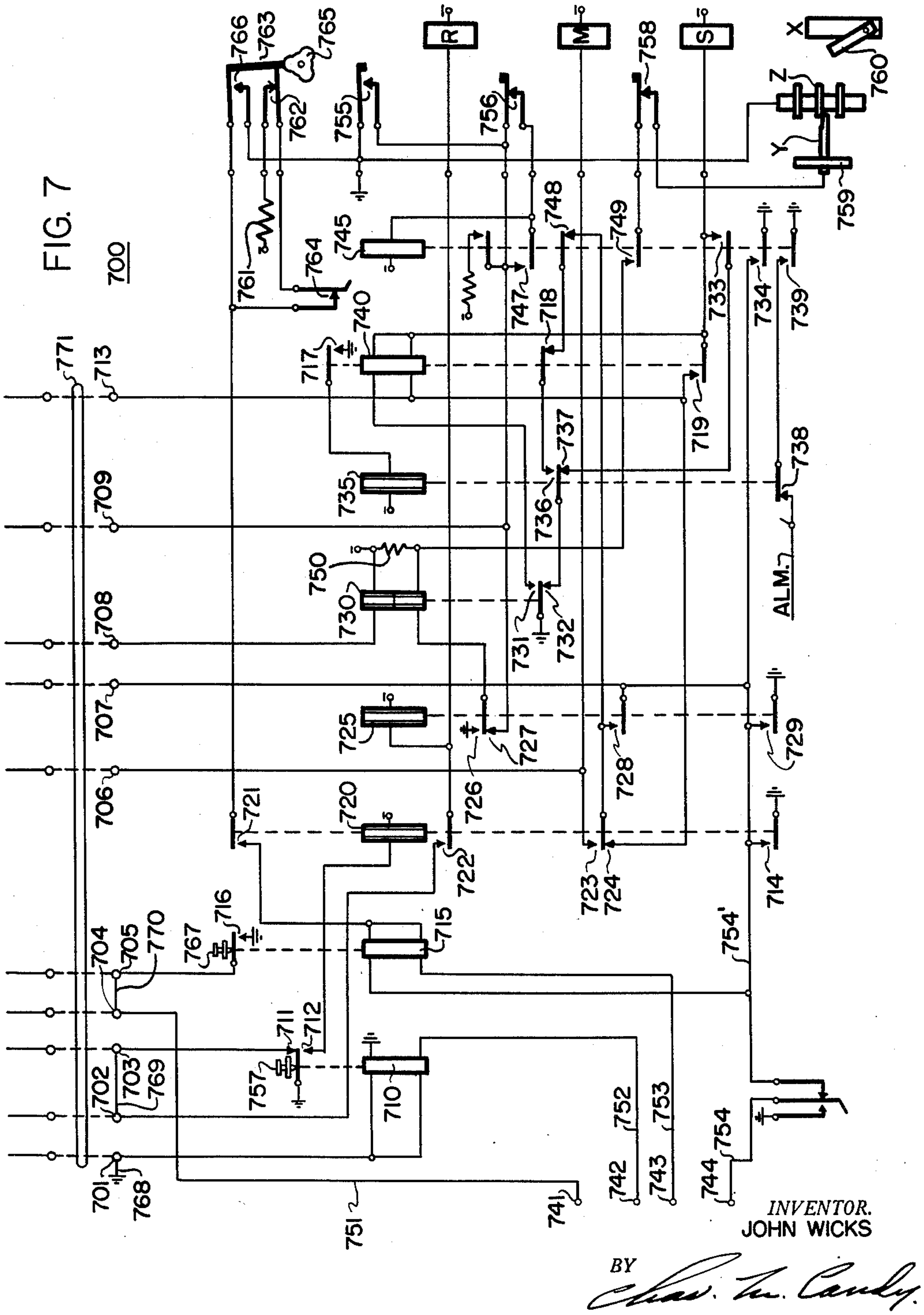

Figure 8 in combination with Figure 7 of the present drawings is utilized for the condition wherein the impulse regenerating network of the present invention is made common to a group of trunks of the polar duplex impulsing telephone system, and wherein the transmitting of the regenerated impulses is not delayed. Figure 8 in combination with Figures 7 and 10 of the present drawings is utilized for the condition wherein the impulse regenerating network of the present invention is made common to a group of trunks of the polar duplex impulsing telephone system, and wherein the transmitting of the regenerated impulses is delayed to provide additional trunk hunting time.

Figure 9 in combination with Figure 7 of the present drawings is utilized for the condition wherein the impulse regenerating network of the present invention is made individual to one of the trunks of the polar duplex impulsing telephone system, and wherein the transmitting of the regenerated impulses is not delayed. Figure 9 in combination with Figures 7 and 10 of the present drawings is utilized for the condition wherein the impulse regenerating network of the present invention is made individual to one of the trunks of the polar duplex impulsing telephone system, and wherein the transmitting of the regenerated impulses is delayed to provide additional trunk hunting time.

A suitable mechanical impulse repeater, or regenerating device, for use in the present invention, in disclosed in the J. W. McClew et al. Patent No. 2,188,461 granted January 30, 1940, to which patent reference can be had for a detailed description of the device. It should be understood, however, that the present invention is not limited to a regenerating device of this precise construction and that the use of any form of impulse registering device which functions to store a plurality of series of impulses and is effective to repeat the impulses is contemplated.

The rotary selector shown in Figure 8 may be of any conventional design wherein the selector has no normal, or home, position and wherein the circuit thereof is arranged in accordance with the present invention so that the selector "self-drives" its wipers over the related bank contacts.

*Regenerating network common to a group of trunks—no delay in impulse re-transmission*

Figure 3:
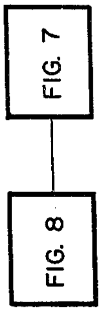
Figure 3 illustrates the method of combining Figures 7 and 8 to form a circuit combination wherein the present invention is made common to a group of trunks of the polar duplex impulsing telephone system, and wherein the transmitting of the regenerated impulses is not delayed.

As previously indicated, Figure 3 of the present drawings shows that Figures 7 and 8 are combined together to form an impulse regenerating network which is made common to a group of toll trunks of a polar duplex impulsing telephone system when the transmission of the regenerated impulses is not delayed.

Assuming now that such an impulse regenerating network is required, then one selector unit 800, as shown in Figure 8, is provided for each of the toll trunks of the polar duplex impulsing telephone system. The outgoing conductors C421, C422, C423 and C424 of each toll trunk of the polar duplex impulsing telephone system are connected to the respective incoming selector 500 of the toll trunk and the respective selector unit 800 of the regenerating network, and the incoming selector 500 of each toll trunk and the respective selector unit 800 of the regenerating network are connected together, as shown at the left-hand end of Figure 8.

Assuming further that two impulse regenerating units 700, as shown in Figure 7 of the present drawings, are required for the traffic over the toll trunks of the polar duplex impulsing telephone system, then terminals 741—744 of both impulse regenerating units 700 are made common to the wipers 841—844 of each selector unit 800, as shown in Figure 8 of the present drawings. In this manner, the two impulse regenerating units 700 are made available to each toll trunk of the polar duplex impulsing telephone system. It should be understood, however, that any required number of impulse regenerating units 700 can be provided to care for the traffic over the toll trunks of the polar duplex impulsing telephone system, by making the terminals 741—744 of each impulse regenerating unit 700 available to the wipers 841—844 of each selector unit 800.

Picking up the description in the specification of Patent No. 2,500,392 of the call from switchboard 210 to the called substation T601 at the point when signal relay R475 of repeater 400 is first operated, a description of the operation of the call as it passes through the impulse regenerating network comprising Figures 8 and 7 of the present drawings will now be given.

The operation of signal relay R475 completes a circuit from battery, winding of control relay R445, contact 476, lower winding of supervisory relay R450, contact 444, conductor C424 in Figure 8, contacts 831, 822, winding of relay 810 to ground. Relay 810 and control relay R445 accordingly operate, but supervisory relay R450 does not operate because both windings of supervisory relay R450 are now energized and relay R450 is of the differential type. Control relay R445 operates busy relay R430 over an obvious circuit. At contact 434, busy relay R430 connects ground potential to conductor C423, and this ground potential is extended through VON spring set S570 of incoming selector 500 to the upper winding of transfer relay R560. Transfer relay R560 accordingly operates, and by this action incoming selector 500 is seized from repeater 400.

If at the moment that relay 810 of the selector unit 800 under discussion operates over the related C424 conductor, the impulse regenerating unit 700 connected to the wipers 841—844 of the selector unit 800 under discussion is in prior use from another one of the toll trunks of the polar duplex impulsing telephone system, then there will be ground potential on the 844 wiper of the selector unit 800 under discussion. This ground potential on wiper 844 of the selector unit 800 under discussion will energize the related motor magnet 835 through contacts 825, 811 and interrupter contact 836, and energized magnet 835 will "self-drive" its wipers 841—844 to the terminals of the next impulse regenerating unit 700 in well-known manner.

If, on the other hand, at the moment that relay 810 of the selector unit 800 under discussion operates over the related C424 conductor, the impulse regenerating unit 700 connected to the wipers 841—844 of the selector unit 800 under discussion is in the "free" condition, then there will be no ground potential on the 844 wiper of the selector unit 800 under discussion. As a consequence, the related motor magnet 835 is not energized and, therefore cannot drive wipers 841—844 of the selector unit 800 under discussion from the terminals 741—744 of the impulse regenerating unit 700 shown in Figure 7.

Returning now to the description of the call in progress, and assuming that the impulse regenerating unit 700 shown in Figure 7 is not in prior use, then wipers 841—844 of the selector unit 800 shown in Figure 8 remain connected to terminals 741—744 of impulse regenerating unit 700. Relay 810 of selector unit 800 has operated over the circuit path previously described and, since there is no ground potential on terminal 744 of impulse regenerating unit 700 to short-circuit relay 820, relay 820 is operated over the circuit path from ground through contact 812, winding of relay 820, interrupter contact 836, winding of magnet 835 to battery. Magnet 835 does not operate under this condition due to the high resistance of the winding of relay 820, and wipers 841—844 remain connected to terminals 741—744 of impulse regenerating unit 700.

At contact 825, relay 820 extends ground potential through contacts 812 and 834 to terminal 744 for the purpose of busying impulse regenerating unit 700 against possible seizure from another selector unit associated with another toll trunk of the polar duplex impulsing telephone system. At contact 821, relay 820 connects the winding of relay 830 to terminal 741 of impulse regenerating unit 700: at contact 822, opens the operating circuit to relay 810 but relay 810 does not restore immediately due to its slow-to-release characteristic: at contact 823, extends conductor C424 to terminal 742 of impulse regenerating unit 700: at contact 824, connects terminal 743 of impulse regenerating unit 700 to conductor 814 leading to impulse relay R540 of the incoming selector 500 of the toll trunk: at contact 825 disconnects magnet 835 from terminal 744 of impulse regenerating unit 700; and at contact 826, prepares a locking circuit to terminal 744 of impulse regenerating unit 700.

Ground potential is connected via terminal 701 to the junction between the upper and lower windings of relay 710, the other end of the upper winding of relay 710 is connected to ground potential, and the other end of the lower winding of relay 710 is connected to terminal 742. The upper winding of relay 710 is, therefore, short-circuited, and battery potential from repeater 400 of the toll trunk conductor C424 is extended to the lower winding of relay 710 over terminal 742 and conductor 752, causing relay 710 to operate. Relay 710 functions as a line impulsing relay and is fitted with micrometer adjustment means 757 for the armature which operates contacts 711 and 712 in order that very close adjustments of the contacts can be made. At contact 712, relay 710 completes an obvious operating circuit to relay 720.

At contact 714 operated relay 720 connects ground potential to terminal 744 over conductor 754' and 754 for the purpose of completing a locking circuit for operated relay 820 of selector unit 800, before relay 810 has had sufficient time to restore and, at contact 812, open the operating circuit to relay 820. Operated relay 820 is, therefore, locked in the operated position for the time being, in order to maintain contacts 821, 823, 824 and 826 closed. At contact 721, relay 720 completes a circuit from battery, coil 761, contacts 762 of impulse spring assembly 763, switch 764, contact 721, upper winding of relay 715 to ground on conductor 754', and a multiple circuit from battery, coil 761, contacts 762, 764, 721, lower winding of relay 715, conductor 753, terminal 743, wiper 843, contact 824, conductor 814 to incoming selector 500 shown in Figure 5 of the drawings of Patent No. 2,500,392, contact 534 of Figure 5 of Patent No. 2,500,392, winding of impulse relay R540 to ground, causing relay R540 of Patent No. 2,500,392 to operate and thereby condition incoming selector 500 for being impulsed. Relay 715 of the present drawings, however, does not operate at this time because its windings are connected differentially and, therefore, the present current flows through the two windings now oppose each other.

The dialing of the second digit of the directory number of called substation T601 by the operator at switchboard 210 causes signal relay R475 of repeater 400 of the toll trunk to follow the impulses of this second digit, in the manner explained in the specification of Patent No. 2,500,392. Each time signal relay R475 restores, it interrupts, at contact 476, the operating circuit to control relay R445 of repeater 400 and impulse relay 710 of the impulse regenerating unit 700. Also, each time signal relay R475 restores, it connects, at contact 477, ground potential through the lower windings of supervisory relay R450 and impulse relay 710 to ground potential on conductor 768. Impulse relay 710 accordingly restores. Conversely, each time signal relay R475 re-operates, it completes, at contact 476, the operating circuit to control relay R445 and impulse relay 710. Also, each time signal relay R475 re-operates, it removes, at contact 477, ground potential from the lower windings of supervisory relay R450 and impulse relay 710. Impulse relay 710 accordingly re-operates.

Each time impulse relay 710 restores, a circuit is completed from ground, contact 711, terminals 703, 702, contact 722, winding of receiving magnet R of the mechanical impulse regenerating device to battery, and receiving magnet R, therefore, follows the impulses of the second digit. Relay 720 is of the slow-to-release type and, consequently, does not restore during this second series of impulses. Also at contact 711, a circuit is completed to relay 725 by way of contact 722, relay 725 operating with the first impulse of this second series and remaining operated for the balance of this impulse series.

At contact 728, relay 725 completes a circuit to marking magnet M of the mechanical impulse regenerating device from ground on conductor 754', contacts 728, 723, winding of marking magnet M to battery, causing marking magnet M to be energized for the balance of the second series of impulses. At contact 726, relay 725 completes an obvious circuit to the lower winding of relay 730, causing relay 730 to operate and remain operated for the balance of the second series of impulses. At contact 729, relay 725 connects a multiple ground to conductor 754' in order to provide an additional guard period for impulse regenerating unit 700. Energized marking magnet M tilts lever 760 of disc X clear of the stop pins Z for the time being, in the manner described in Patent No. 2,188,461.

The operation of the mechanical impulse regenerating device to receive and transmit impulses is described in detail in Patent No. 2,188,461, and the following brief description is given in order that the operation of the device in conjunction with the control relays of the impulse regenerating unit 700 may be fully understood.

Responsive to the first deenergization of receiving magnet R, the off-normal contact 755 of the mechanical impulse regenerating device is closed to prepare an operating circuit to relay 745, which circuit is open at interrupter contact 756 of energized marking magnet M. In addition, at contact 731, relay 730 completes a circuit through the upper winding of relay 740 by way of the winding of sending magnet S. Relay 740 is thereby operated but sending magnet S does not operate owing to the high resistance of the upper winding of relay 740. At contact 719, relay 740 short-circuits its lower winding so that relay 740 is rendered slow to release. At contact 717, relay 740 causes slave relay 735 to operate and, at contact 738, open a further point in the circuit of a slow-to-operate alarm. Relays 725, 730, 740 and 735 remain operated until the end of the second series of impulses when relay 725 restores after a short interval due to the final opening of contact 711. The energizing circuit of receiving magnet R is now open at contact 711, since the pulsing of receiving magnet R has caused the rotation of disc X the proper number of steps to select the stop pin Z corresponding to the value of the second series of impulses, in the manner described in Patent No. 2,188,461.

At contact 728, relay 725 opens the energizing circuit to marking magnet M which causes interrupter 756 to close and complete the prepared circuit to relay 745 from ground, off-normal contact 755 (contact 755 remaining closed until the cycling of the impulse regenerating device is completed subsequent to the receipt of the final series of incoming impulses), contact 756, winding of relay 745 to battery, causing relay 745 to operate and lock through contact 747 to ground at off-normal contact 733 independent of contact 756. The de-energization of marking magnet M also permits lever 760 of advanced disc X to restore thereby pushing the selected stop pin Z into the path of reset pin Y. At contact 726, relay 725 disconnects ground potential from the lower winding of relay 730 but relay 730 does not restore before relay 725 closes contact 727 and thereby provides holding ground through off-normal contact 755 to the lower winding of relay 730. At contact 729, relay 725 removes a multiple guarding ground from conductor 754'.

At contact 733, relay 745 prepares a circuit to sending magnet S: at contact 734, connects a multiple ground to conductor 754' to provide an additional guard period for impulse regenerating unit 700: at contact 739, prepares an alarm circuit which is open at contact 738; and, at contact 749, completes a circuit from ground, displaced stop pin Z which was left displaced in the path of reset pin Y at the completion of the regeneration on the preceding call, reset pin Y, interrupter contact 758 of sending magnet S, contact 749 to the junction between the lower winding of relay 730 and coil 750 to short-circuit the lower winding of relay 730.

After a short interval, relay 730 restores and, at contact 731, opens the circuit to the upper winding of relay 740, the restoration of relay 740 being delayed by its short-circuited lower winding. At contact 717, relay 740 opens the circuit of relay 735 but relay 735 is slow in restoring due to its slow-to-release characteristic. The restoration of relay 735 completes a circuit to sending magnet S from ground, contacts 732, 737, 733, winding of sending magnet S to battery, causing sending magnet S to energize. The energization of sending magnet S causes interrupter contact 758 to open, thereby removing the short-circuiting ground from the lower winding of relay 730, and relay 730 immediately re-operates to open the energizing circuit of sending magnet S at contact 732. The de-energization of sending magnet S causes reset pin Y to restore the displaced stop pin Z against which it is resting, thereby freeing disc 759 for rotation.

The restoration of relay 735 also completes the alarm circuit at contact 738, but under regular operation relay 735 will re-operate early enough to prevent the sounding of the alarm. At contact 731, reoperated relay 730 again completes the operating circuit of relay 740 by way of the winding of sending magnet S, causing relay 740 to operate, but not sending magnet S. At contact 719, relay 740 short-circuits its lower winding to make itself slow to release at a later period. At contact 717, relay 740 again completes the circuit to relay 735, and relay 735 re-operates to open the alarm circuit. Should relay 735 fail to re-operate, the alarm will sound, thus indicating irregular functioning or failure of impulse reception or regeneration.

Disc 759 rotates by spring power, in the manner described in Patent No. 2,188,461, to cause reset pin Y to advance into mechanical and electrical contact with the displaced stop pin Z corresponding to the value of the second series of impulses. Meanwhile the dialing of the third digit by the calling operator at switchboard 210 causes a third series of impulses to be received by the impulse regenerating device. The disc X is, therefore, advanced to a further position where a further stop pin Z is displaced into the path of reset pin Y to register the third series of impulses in the manner described in Patent No. 2,188,461. It should be understood at this time that the described interactions between relays 730, 740 and 735 is for the purpose of providing suitable spacing between the reception and retransmission of the impulse series.

Disc 759 drives the impulse cam 765 under the control of an adjustable speed governor in the manner described in Patent No. 2,188,461, and thereby transmits a series of impulses over conductor 814 to the impulse relay R540 of the incoming selector 500 of Patent No. 2,500,392, whereupon reset pin Y of the impulse regenerating device reaches the displaced stop pin Z corresponding to the value of the received second series of impulses, to lock disc 759 against further rotation at this time. This retransmitted series of impulses is of the correct speed due to the governor-controlled driving of impulse cam 765, and the shape of impulse cam 765 establishes the correct ratio.

Impulse cam 765 delivers alternate ground and battery impulses to conductor 814. The ground impulses shunt both windings of relay 715, and relay 715 cannot operate under this condition. The battery impulses from cam 765 cannot operate relay 715 because, as previously explained, current flows through the two windings of relay 715 are in opposite directions and neutralize each other. Relay 715 of impulse regenerating unit 700, therefore, remains dormant for the entire impulse retransmission period.

Impulse relay R540 of incoming selector 500 now follows the impulsing of cam 765. Impulse relay R540 restores on each ground impulse from cam 765 and re-operates on each battery impulse and, therefore, the first series of regenerated impulses from cam 765 cause the elevation and automatic rotation of the wipers of incoming selector 500 to a free toll selector-repeater 600, in the manner described in Patent No. 2,500,392. The seized toll selector-repeater 600 is disclosed in Figure 6 of Patent No. 2,500,392.

As reset pin Y comes into electrical contact with said second displaced stop pin Z, the lower winding of re-operated relay 730 is short circuited from ground, said second displaced stop pin Z, reset pin Y, interrupter contact 758 of sending magnet S, contact 749 to the junction between the lower winding of relay 730 and coil 759. After a short interval, re-operated relay 730 restores, and, at contact 731, opens the circuit to the upper winding of re-operated relay 740, the restoration of re-operated relay 740 being delayed by its short-circuited lower winding. At contact 717, relay 740 opens the circuit to the re-operated relay 735 which restores after a short interval. The operating circuit to sending magnet S is, therefore, again completed from ground, contacts 732, 737, 733, winding of sending magnet S to battery, causing sending magnet S to re-energize. The re-energization of sending magnet S causes interrupter contact 758 to re-open, thereby removing the short-circuiting ground from the lower winding of relay 730, and relay 730 re-operates a second time to again open the energizing circuit of re-energized sending magnet S at contact 732. This second de-energization of sending magnet S causes reset pin Y to restore the displaced stop pin Z against which it is now resting to again free disc 759 for rotation.

At contact 731, twice re-operated relay 730 again completes the operating circuit of relay 740 by way of the winding of sending magnet S, causing relay 740 to re-operate a second time. At contact 719, relay 740 again short-circuits its lower winding to re-establish its slow-to-release characteristic. At contact 717, relay 740 again completes the circuit to relay 735, and relay 735 again re-operates.

Responsive to the seizure of toll selector-repeater 600, incoming selector 500 "switches through" in the manner described in Patent No. 2,500,392, relay R530 disconnecting impulse relay R540 from conductor 814 at contact 534 and connecting conductor C614 to conductor 814 at contact 533. The impulsing circuit from impulse cam 765 of the impulse regenerating device is thereby extended to ground by way of the lower winding of impulse relay R630 of the toll selector-repeater 600 and contacts 654, 648, and impulse relay R630 operates over this extended circuit preparatory to pulsing toll selector-repeater 600.

In a manner similar to that just described, impulse cam 765 of the impulse regenerating device transmits successive series of regenerated impulses corresponding to the third, fourth and fifth series of dialed impulses from the calling switchboard 210, to first operate the toll selector-repeater 600 to select and seize a free toll connector 603, and then operate the seized toll connector 603 to seize and signal the called substation T601. The interdigital pause between the series of regenerated impulses is determined by the serial release times of relays 730, 740 and 735 and the operation and release of sending magnet S, thereby to provide longer trunk-hunting periods for the switches ahead than would ordinarily be provided. The descriptions of the operations of incoming selector 500, toll selector-repeater 600 and toll connector 603 are contained in the specification of Patent No. 2,500,392 and, therefore, need not be repeated herein.

When all of the digits dialed at the calling switchboard 210 have been registered in the impulse regenerating device of impulse regenerating unit 700 and the final stop pin Z is displaced into the path of reset pin Y, disc X of the impulse regenerating device comes to rest. When all of the corresponding regenerated impulses have been transmitted by impulse cam 765, disc 759 overtakes disc X and reset pin Y comes to rest against the said final displaced stop pin Z in preparation for the next call. Off-normal contact 755 is opened, thereby unlocking relay 745, and relay 745 restores. The opening of off-normal contact 755 also opens the holding circuit of relay 730, and relay 730 accordingly restores. At contact 731, restored relay 730 causes relay 740 to restore after a short interval, and relay 740, at contact 717, causes relay 735 to restore in turn after a short interval.

At armature 734, relay 745 removes a multiple guarding ground from conductor 754' since the impulse regenerating device has now been returned to normal condition in preparation for the next call. At armature 733, relay 745 opens a point in the operating circuit of sending magnet S and, at contact 739, opens a point in the mentioned alarm circuit.

When the party at called substation T601 answers the call, battery potential is returned over conductor C614 in the manner explained in Patent No. 2,500,392, and this battery potential is further extended over conductor 814, contact 824, wiper 843, terminal 743, conductor 753 to the lower winding of relay 715. The lower winding of relay 715 is thus effectively short-circuited to the battery potential from impulse cam 765 through contacts 721, 764 and 762. As a consequence, relay 715 is operated over the circuit from ground on conductor 754', upper winding of relay 715, contacts 721, 764, 762, coil 761, to battery. Relay 715 completes a circuit from ground, contact 716, terminals 705, 704, conductor 751, terminal 741, wiper 841, contact 821, winding of relay 830 to battery, causing relay 830 to operate and lock to the ground on conductor C423 through contact 833. At contact 832, relay 830 switches conductor C424 to conductor 814, thereby completely switching repeater 400 through to incoming selector 500. At contact 831, relay 830 disconnects conductor C424 from the lower winding of relay 710 of impulse regenerating unit 700, causing relay 710 to restore. At contact 834, relay 830 opens the locking circuit of relay 820. The restoration of relay 820 disconnects conductor 814 from the lower winding of relay 715 of impulse regenerating unit 700 at contact 824; disconnects conductor C423 from conductor 751 at contact 821; and opens a further point in the circuit of relay 710 at contact 823.

The restoration of relay 710 opens the circuit of relay 720 at contact 712, and relay 720 restores after a short interval. Relay 725 and receiving magnet R, however, are operated from ground at contact 711 during the slow release period of relay 720. At contact 729, relay 725 maintains ground potential on conductor 754′ for a short interval after the restoration of relay 720 to provide ample time for the complete restoration of impulse regenerating unit 700 and its associated impulse regenerating device. At contact 714, relay 720 removes a multiple ground from conductor 754′; at contact 721, opens the holding circuit through the upper winding of relay 715; and, at contact 722, opens the holding circuits of relay 725 and receiving magnet R. Relays 715, 725 and receiving magnet R restore accordingly, and relay 725 removes the last ground potential from conductor 754′. Impulse regenerating unit 700 is now free for use by another toll trunk of the polar duplex impulsing telephone system.

It is unnecessary to include further details of the call between switchboard 210 and substation T601 in the present specification, as such details are contained in the specification of Patent No. 2,500,392. Upon the release of the connection after the conversation between the calling and called persons has been terminated, ground is removed from conductor C423 thereby unlocking relay 830. The restoration of relay 830 returns selector unit 800 to normal condition.

Considering now the case where the calling operator at switchboard 210 abandons a call without completing the dialing, then relay 710 is restored responsive to the removal of battery potential from conductor C424. At contact 712, relay 710 opens the holding circuit of relay 720, and relay 720 restores after a short interval. The operating circuit to relay 725 and the energizing circuit to receiving magnet R are completed, however, during the slow release time of relay 720, from ground, contact 711, terminals 703, 702 and contact 722. It should be understood that receiving magnet R advances disc X on the release-drive principle so that before disc X can be moved, relay 725 will have operated and energized marking magnet M by way of contacts 728 and 723, thereby to tilt lever 760 away from the stop pin Z circle and thus free disc X for rotation. At contact 729, relay 725 extends guarding ground to conductor 754′ before relay 720 has restored.

The calling operator may abandon the call before dialing the second digit of the directory number of substation T601, or before dialing the third, fourth or fifth digits as circumstance dictates. In the event the operator abandons without dialing the second digit, then the restoration of relay 720 opens the energizing circuits of receiving magnet R and relay 725 at contact 722, and very shortly thereafter the energizing circuit of marking magnet M at contact 723. The de-energization of receiving magnet R causes disc X to advance one step and select the stop pin adjacent the stop pin Z against which reset pin Y is resting, and the de-energization of marking magnet M causes lever 760 to displace the selected stop pin Z into the path of reset pin Y. As disc X moves responsive to the de-energization of receiving magnet R, off-normal contact 755 closes to operate and lock relay 745, and relay 745 connects additional guarding ground to conductor 754′ at contact 734. The restoration of relay 720 also connects ground potential through contacts 729, 728 and 724 to the junction between contact 719 and the lower winding of relay 740, and in the meantime operated relay 725 has caused the successive operations of relays 730, 740 and 735.

The described ground potential at contact 719, therefore, passes through contact 719 to energize sending magnet S before relay 745 had operated and closed contact 749. The ground potential through contact 719 short-circuits the upper winding of relay 740, and shortly thereafter relay 740 restores to open the energizing circuit of sending magnet S at contact 719 and the holding circuit of relay 735 at contact 717. The de-energization of sending magnet S causes reset pin Y to restore the displaced stop pin Z against which it is resting, and disc 759 thereupon advances reset pin Y into contact with the adjacent displaced stop pin Z. As reset pin Y comes to rest against the adjacent displaced stop pin Z, off-normal contact 755 opens to unlock and restore relay 745. In the meantime, restored relay 720 has opened the outgoing impulsing circuit at contact 721 to cause the release of conditioned incoming selector 500, and the restoration of relay 725 causes the restoration of relay 730 at contact 726, the removal of guarding ground at contact 729, and the removal of ground potential from the lower winding of relay 740 at contact 728. At contact 734, restored relay 745 removes the last guarding ground from conductor 754′, and impulse regenerating unit 700 is now at normal and available for a subsequent call.

In the event the operator abandons the call after dialing the second digit ("0," for example,) without dialing the third digit, then relay 710 restores and shortly thereafter relay 720 restores. The impulse regenerating device will have started the regeneration of the impulses of the registered digit "0," in the manner previously explained, and reset pin Y will be automatically advanced into contact with the displaced stop pin Z corresponding to the value of the registered digit. In the meantime restored relay 720 has opened the outgoing impulsing circuit at contact 721 to cause the release of conditioned incoming selector 500; has opened the multiple energizing circuits to relay 725 and receiving magnet R at contact 722; and, shortly thereafter, has opened the energizing circuit of marking magnet M at contact 723. From this point on, the manner of restoring the impulse regenerating device to normal condition is essentially the same as that just described for the instance where the operator abandons a call without registering one series of impulses in the impulse regenerating device.

The calling operator at switchboard 210 can, of course, abandon a call after having registered two, three or four digits in the impulse regenerating device. In any of these events, the restoration of the impulse regenerating device to normal condition is similar to that described in the preceding paragraph wherein the call is abandoned after the second digit is dialed but not the third digit.

*Regenerating network common to a group of trunks—delay in impulse retransmission*

Figure 4:
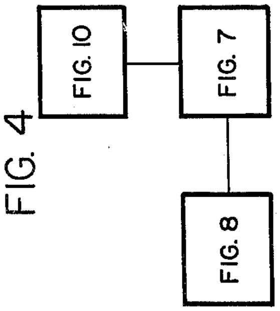
Figure 4 illustrates the method of combining Figures 7, 8 and 10 to form a circuit combination wherein the present invention is made common to a group of trunks of the polar duplex impulsing telephone system, and wherein the transmitting of the regenerated impulses is delayed.

As previously indicated, Figure 4 of the present drawings shows that Figures 7, 8 and 10 are combined together to form an impulse regenerating network which is made common to a group of toll trunks of a polar duplex impulsing telephone system, and wherein the transmission of the regenerated impulses to the switch, or switches, ahead is delayed to provide additional trunk hunting time for the switch, or switches, ahead. In the present disclosure, however, the transmission of regenerated impulses is prevented beyond the first switch ahead (incoming selector 500) when incoming selector 500 is unable to find a free trunk outlet, and supervision is accordingly relayed back to the calling operator at switchboard 210 to abandon the attempted call.

To combine Figures 7, 8 and 10 to form such an impulse regenerating network, the jumpers 768, 769 and 770 shown in Figure 7 are disconnected and the dotted-line jumpers 771 are connected up instead. In this manner Figures 7 and 10 are interconnected. As specified in the preceding section titled "Regenerating network common to a group of trunks—No delay in impulse retransmission," the terminals 741—744 of each impulse regenerating unit is made available to the banks of the selector units 800 which are associated with the toll trunks of the polar duplex impulsing telephone system.

The operation of a call originated at switchboard 210 for a connection to substation T601 when relay unit 1000 is used in combination with impulse regenerating unit 700 to delay the regeneration of the registered impulses, is the same as that described in the mentioned preceding section of this specification up to the point where selector unit 800 seizes a free impulse regenerating unit 700. From that point on, the operation is as follows:

Ground potential is connected via contact 1012 and terminal 701 to the junction between the two windings of relay 710, the other end of the upper winding of relay 710 is connected to ground potential, and the other end of the lower winding of relay 710 is connected to terminal 742. The upper winding of relay 710 is, therefore, short-circuited, and the battery potential from repeater 400 of the toll trunk over conductor C424 is extended to the lower winding of relay 710 over wiper 842, terminal 742 and conductor 752, causing relay 710 to operate. At contact 721, relay 710 completes an obvious operating circuit to relay 720.

At contact 714, operated relay 720 connects ground potential to terminal 744 for completing a locking circuit for operated relay 820 of selector unit 800 before relay 810 has had sufficient time to restore and open the operating circuit of relay 820 at contact 812. At contact 714, relay 720 also completes a circuit to relay 1045 by way of terminal 707 and contact 1038, causing relay 1045 to operate. At contact 721, relay 720 completes a circuit from battery, coil 761, contacts 762, 764, 721, upper winding of relay 715 to ground on conductor 754', and a multiple circuit from battery, coil 761, contacts 762, 764, 721, lower winding of relay 715, conductor 753, terminal 743, wiper 843, contact 824, conductor 814 to incoming selector 500 of the toll trunk, contact 534 of Figure 5 of Patent No. 2,500,392, winding of impulse relay R540 to ground, causing relay R540 to operate. Relay 715 of the present drawings, however, does not operate at this time because its windings are differentially connected and, therefore, the current flows through the two windings now oppose each other. At contact 1046, relay 1045 completes an obvious operating circuit to relay 1050, but operated relays 1045 and 1050 have no function at this time.

Each time impulse relay 710 restores, responsive to the dialing of the second digit at calling switchboard 210, a circuit is completed from ground, contact 711, terminal 703, contacts 1019, 1024, terminal 702, contact 722, winding of receiving magnet R to battery, and receiving magnet R, therefore, follows the impulses of the second digit. Also at contact 711, a circuit is completed to relay 725 by way of contact 722, relay 725 operating with the first impulse of this second series and remaining operated for the balance of this impulse series.

At contact 728, relay 725 completes a circuit to marking magnet M from ground on conductor 754', contacts 728, 723, winding of marking magnet M to battery, causing marking magnet M to be energized for the balance of the second series of impulses. At contact 728, relay 725 also completes a circuit to relay 1025 from ground on conductor 754', contacts 728, 723, terminal 706, winding of relay 1025 to battery, causing relay 1025 to operate. At contact 726, relay 725 completes an obvious circuit to the lower winding of relay 730, causing relay 730 to operate and remain operated for the balance of the second series of impulses. At contact 729, relay 725 connects a multiple ground to conductor 754 in order to provide an additional guard period for impulse regenerating unit 700. Energized marking magnet M tilts lever 760 of disc X clear of the stop pins Z for the time being. At contacts 1027 and 1028, relay 1025 prepares circuits to the upper and lower windings, respectively, of relay 1020.

Responsive to the first deenergization of receiving magnet R, the off-normal contact 755 of the mechanical impulse regenerating device is closed to prepare an operating circuit to relay 745, which circuit is open at contact 756 of energized marking magnet M. Off-normal contact 755 also completes a circuit to relay 1030 by way of terminal 709, contact 1061, winding of relay 1030 to battery, causing relay 1030 to operate. At contact 1031, relay 1030 extends its ground connection to the upper winding of relay 1020 by way of contact 1027 and, at contact 1032, connects ground to the lower winding of relay 1020 by way of contact 1028. Relay 1020, however, does not operate at this time because its windings are differentially connected.

At contact 731, relay 730 completes a circuit through the upper winding of relay 740 by way of the winding of sending magnet S. Relay 740 is thereby operated but not sending magnet S. At contcat 719, relay 740 short-circuits its lower winding so that relay 740 is rendered slow to release. At contact 717, relay 740 causes slave relay 735 to operate and, at contact 738, disable a slow-to-operate alarm. Relays 725, 730, 740 and 735 remain operated until the end of the second series of impulses when relay 725 restores after a short interval. The energizing circuit of receiving magnet R is also opened at contact 711, since the pulsing of receiving magnet R has caused the rotation of disc X the proper number of steps to select the stop pin Z corresponding to the value of the second series of impulses.

At contact 728, relay 725 opens the energizing circuit to marking magnet M which causes interrupter contact 756 to close and complete the circuit to relay 745 from ground, off-normal contact 755, contact 756, winding of relay 745 to battery, causing relay 745 to operate and lock through contact 747 to ground at off-normal contact 755 independent of contact 756. The de-energization of marking magnet M permits lever 760 of advanced disc X to restore thereby pushing the selected stop pin Z into the path of reset pin Y. At contact 728, relay 725 also opens the circuit to relay 1025, causing relay 1025 to restore. At contact 726, relay 725 disconnects ground from the lower winding of relay 730 but relay 730 does not restore before relay 725 closes contact 727 and thereby provides holding ground through off-normal contacts 755 to the lower winding of relay 730. At contact 729, relay 725 removes a multiple guarding ground from conductor 754'.

At contact 733, relay 745 prepares a circuit to sending magnet S; at contact 734, connects a multiple ground to conductor 754' to provide an additional guard period for the impulse regenerating unit 700; at contact 739, prepares an alarm circuit which is open at contact 738; and at contact 749, completes a circuit from ground, displaced stop pin Z which was left displaced at the completion of the regeneration on the preceding call, reset pin Y, contact 758 of sending magnet S, contact 749 to the junction between the lower winding of relay 730 and coil 750 to short circuit the lower winding of relay 730.

After a short interval, relay 730 restores and, at contact 731, opens the circuit to the upper winding of relay 740, the restoration of relay 740 being delayed by its short-circuited lower winding. At contact 717, relay 740 opens the circuit of relay 735 but relay 735 is slow in restoring. The restoration of relay 735 completes a circuit to sending magnet S from ground contacts 732, 737, 733, winding of sending magnet S to battery, causing sending magnet S to energize. The energization of sending magnet S causes contact 758 to open, thereby removing the short-circuiting ground from the lower winding of relay 730, and relay 730 re-operates to open the energizing circuit of sending magnet S at contact 732. The de-energization of sending magnet S causes reset pin Y to restore the displaced stop pin Z against which it is resting, thereby freeing disc 759 for rotation.

At contact 731, re-operated relay 730 again completes the operating circuit of relay 740 by way of the winding of sending magnet S, causing relay 740 to operate but not sending magnet S. At contact 719 re-operated relay 740 short-circuits its lower winding to make itself slow to release at a later period. At contact 717, relay 740 again completes the circuit to relay 735 and relay 735 re-operates to open the alarm circuit.

The disc 759 rotates by spring power to cause reset spring Y to advance into mechanical and electrical contact with the displaced stop pin Z corresponding to the value of the second series of impulses. Meanwhile the dialing of the third digit at the calling switchboard 210 causes a third series of impulses to be received by the impulse regenerating device. The disc X is, therefore, advanced to a further positon where a further stop pin Z is displaced to register the third series of impulses.

Disc 759 drives impulse cam 765 under the control of the adjustable speed governor and thereby transmits a series of impulses over conductor 814 to the impulse relay R540 of the incoming selector 500, whereupon reset pin Y reaches the displaced stop pin Z corresponding to the value of the received second series of impulses. Alternate ground and battery impulses are delivered by impulse cam 765 in the manner described in the preceding section of this specification. Impulse relay R540 restores on each ground impulse from cam 765 and re-operates on each battery impulse and, therefore, the first series of regenerated impulses from cam 765 cause the elevation and automatic rotation of the wipers of incoming selector 500 into the bank level of trunks (such as 610) leading to toll selector-repeaters (such as 600).

Now assuming that there is no free toll selector-repeater (such as 600), then the wipers of incoming selector 500 are rotated to the eleventh rotary step in well-known manner. The contact sets S582, S583 and S584 in Figure 5 of the drawings of Patent No. 2,500,392 are thereby operated, resulting in the intermittent operation of busy relay R565 and the consequent alternate ground and battery impulses back over conductor 814 by way of contact 533, in the manner described in the specification of Patent No. 2,500,392. The ground impulses back over conductor 814 energize the lower winding of relay 715 in the opposite direction to the current flowing through the upper winding of relay 715 and relay 715, therefore, cannot operate under this condition. The battery impulses back over conductor 814, however, short-circuit the lower winding of relay 715 thereby unbalancing relay 715 and permitting it to operate over the circuit from ground on conductor 754', upper winding of relay 715, contacts 721, 764, 762, coil 761 to battery. The alternate operations and restorations of relay 715 cause relay 1035 to correspondingly operate and restore by way of contact 716 and terminal 705. The armature of relay 715 is fitted with micrometer adjusting means 767 in order that close adjustment of contact 716 can be made.

The first operation of relay 1035 causes relay 1040 to operate from ground on conductor 754', terminal 707, contact 1037, winding of relay 1040 to battery, and relay 1040 remains operated due to its slow-to-restore characteristic for the balance of the pulsing of relay 1035. At contact 1038, relay 1035 opens and closes the circuit to relay 1045 but relay 1045 also does not restore during the pulsing of relay 1035.

At contact 1036, the first operation of relay 1035 causes relay 1015 to operate by way of contacts 1052, 1026, 1018 and, at contact 1019, open the operating circuits to relay 725 and receiving magnet R. Relay 1015 locks to ground by way of contacts 1017 and 1041. The alternate closings and openings of contact 1036 cause relay 1010 to correspondingly operate and restore by way of contacts 1052 and 1016, thereby to transmit alternate battery and ground impulses by way of contacts 1011 and 1012, respectively, through terminal 701, lower winding of relay 710, terminal 742, wiper 842, contacts 823, 831, conductor C424, contact 444, lower winding of supervisory relay R450 to battery or ground, as the case may be. The sole function of relay 710 under these conditions is to maintain relay 720 operated to hold the connection for the time being.

In the meantime the rotation of disc 759 has caused reset pin Y to advance into mechanical and electrical contact with the displaced stop pin Z corresponding to the value of the second series of impulses, and a ground shunt is connected to the junction between the lower winding of relay 730 and coil 750 by way of off-normal contact 755, displaced stop pin Z corresponding to the value of the second series of impulses, reset pin Y, contact 758 of sending magnet S and contact 749. Re-operated relay 730, however, cannot restore at this time because the operation of relay 1040 responsive to the described first operation of relay 1035 caused re-operated relay 730 to be maintained from ground, contact 1041, terminal 708, upper winding of relay 730 to battery. As a consequence, re-operated relays 740 and 735 cannot be restored and, therefore, the operating circuit to sending magnet S cannot be re-completed at contacts 732 and 737. In this manner, disc 759 remains locked, and the regeneration of the registered third series of impulses cannot be accomplished. The alternate battery and ground impulses through the lower winding of relay 710 back over conductor C424 cause the front supervisory lamp L266' at the calling switchboard 210 to be flashed approximately 120 times per minute in a manner similar to that explained in Patent No. 2,500,392, to indicate that a busy condition in the outgoing toll train has been encountered. The calling operator thereupon withdraws the front plug P212' from the jack J220 to effect the release of the apparatus involved.

Now assuming that the wipers of incoming selector 500 do find a free trunk (such as 610) terminating in a free toll selector-repeater (such as 600) then incoming selector 500 seizes toll selector-repeater 600 and "switches through" in the manner described in Patent No. 2,500,392, relay R530 disconnecting impulse relay R540 from conductor 814 at contact 534 and connecting conductor C614 to conductor 814 at contact 533. The impulsing circuit from impulse cam 765 is thereby extended to ground by way of the lower winding of impulse relay R630 of the toll selector-repeater 600 and contacts 654, 648, and impulse relay R630 operates over this extended circuit preparatory to pulsing the toll selector-repeater 600.

Since, in this instance, the wipers of incoming selector 500 are not rotated to the eleventh step, busy relay R565 of incoming selector 500 is nonresponsive and, therefore, alternate battery and ground impulses are not returned back over conductor 814—only steady ground potential through the lower winding of impulse relay R630 of toll selector-repeater 600 over conductor C614, wiper 574 of incoming selector 500, contact 533 to conductor 814. As a consequence, relay 715 of impulse regenerating unit 700, and relays 1035 and 1040 of relay unit 1000 do not operate and, consequently, relay 730 cannot be retained in the operated position through its upper winding.

Impulse regenerating unit 700, therefore, remains conditioned for regenerating received third, fourth and fifth series of impulses and transmitting the regenerated series of impulses over conductor 814 to cause the successive operations of toll selector-repeater 600 and toll connector 603 to select and signal called substation T601, in a manner similar to that explained in the preceding section of this specification. When called substation T601 answers the call, the subsequent operation, however, varies somewhat in detail as follows:

The returning of battery potential over conductor 814 causes relay 715 to close contact 716 thereby to operate relay 1035 by way of terminal 705. At contact 1038, relay 1030 opens the circuit of relay 1045, causing relay 1045 to restore after a short interval and open the circuit to relay 1050 at contact 1046. Relay 1050 in turn restores after a brief period and closes contact 1051. A circuit for operating relay 830 of selector unit 800 is thereby completed from ground, contacts 1036, 1051, terminal 704, conductor 751, terminal 741, wiper 841 of selector 800, contacts 821, winding of relay 830 to battery.

Relay 830 locks to ground on conductor C423 through contact 833. At contact 832, relay 830 switches conductor C424 to conductor 814, thereby completely switching repeater 400 through to incoming selector 500. At contact 831, relay 830 disconnects conductor C424 from impulse regenerating unit 700 and, at contact 834, opens the locking circuit of relay 820. Relay 820 disconnects conductor 814 from impulse regenerating unit 700 at contact 824, and opens a further point in the circuit of relay 710 at contact 823. The operated relays of impulse regenerating unit 700 and relay group 1000 are thereby restored, thus freeing the impulse regenerating unit 700 for use by another toll trunk.

In a manner similar to that just described for delaying the regeneration of the dialed third, fourth and fifth series of impulses when incoming selector 500 fails to find a free toll selector-repeater (such as 600), impulse regenerating unit 700 and relay group 1000 co-operate to prevent the regeneration of the dialed fourth and fifth series of impulses when the seized toll selector-repeater 600 fails to find a free toll connector (such as 603).

In this latter instance, the wipers of toll selector-repeater 600 are rotated to the eleventh step in well-known manner. The contact sets S691 and S692 in Figure 6 of the drawings of Patent No. 2,500,392, are thereby operated, resulting in the intermittent operation of toll answer relay R660. Alternate battery and ground impulses are, consequently, relayed back over conductor C614, through contact 533 to conductor 814 and thence through the lower winding of relay 715. The resulting alternate battery and ground impulses through the lower winding of relay 710 back over conductor C424 cause the front supervisory lamp L266' at the calling switchboard 210 to be flashed approximately 120 times per minute to indicate that a busy condition has been encountered in the outgoing toll train.

It should be understood at this time that the two foregoing examples of delay in impulse regeneration are typical only and that the present invention is not specifically limited thereto. It should also be understood that the present invention is not restricted to only preventing impulse regeneration after the transmission of the first regenerated series of impulses has been accomplished, but is designed to re-establish the regeneration of subsequent series of impulses after a proper interval of time has elapsed following the transmission of the first regenerated series of impulses.

The re-establishment of impulse regeneration is accomplished by causing the alternate battery and ground impulses over conductor 814 to the lower winding of relay 715 to cease. Relay 715 then ceases to alternately operate and restore, and comes to rest in the restored position. Contact 716, therefore, remains open and relay 1035 restores for the last time. At contact 1037, relay 1035 opens the circuit to relay 1040 which restores in turn after a short interval. At open contact 1041, relay 1040 ceases to maintain relay 730 operated through its upper winding, and relay 730 restores after a short interval due to the short-circuiting of its lower winding from the ground at off-normal contact 755 which was established in the manner previously described. At open contact 1036, relay 1035 ceases to pulse relay 1010.

At contact 731, restored relay 730 opens the circuit to the upper winding of relay 740, causing relay 740 to restore after a short interval and, at contact 717, open the circuit to relay 735. Relay 735 restores in turn after a short interval, and the circuit to sending magnet S is again reestablished from ground, contacts 732, 737 and 733, causing the re-energization of sending magnet S. The re-energization of sending magnet S causes interrupter contact 758 to open, thereby removing the short-circuiting ground from the lower winding of relay 730, and relay 730 reoperates a second time to again open the energizing circuit of re-energized sending magnet S at contact 732. This second de-energization of sending magnet S causes reset pin Y to restore the displaced stop pin Z against which it is resting. The regeneration of the next registered series of impulses is, therefore, started and completed in the manner previously explained. At contact 1041, restored relay 1040 opens the locking circuit of relay 1015, causing relay 1015 to restore and re-establish the circuit from contact 711 of relay 710 at contact 1019. At contact 1016, restored relay 1015 opens a further point in the pulsing circuit to relay 1010, and ground supervision is returned back over conductor C424 by way of the lower winding of relay 710 and conductor 752.

It is further contemplated that impulse regenerating unit 700 and relay group 1000 be used in co-operation with a finder method of trunk hunting, to prevent impulse regeneration until the trunk hunting of a started finder has found a free trunk, and thereafter establish the impulse regeneration in a manner similar to that just described in the immediately preceding paragraphs.

As in the case of the calls described in the preceding section of this specification, the occupied impulse regenerating device is restored to normal condition whenever the operator at calling switchboard 210 abandons a call described in this section without completing the dialing of the called substation's directory number. If no trunk busy condition is encountered on the outgoing toll train, then the restoration of the occupied impulse regenerating device is accomplished in essentially the same manner as that explained in the preceding section. If, however, a trunk busy condition was encountered in the outgoing toll train and impulse regeneration has accordingly been stopped by the locking of disc 759, then the method of restoring the occupied impulse regenerating device to normal condition is accomplished in a somewhat different manner as follows:

Assuming first that the operator abandons just after registering the third digit in the impulse regenerating device, and that the impulse regenerating device is locked against regenerating the registered third digit in the manner previously explained. In this instance just before abandonment, relays 715, 1035 and 1010 are operating and restoring alternately, and relays 710, 720, 1030, 1015, 1040, 1045, 1050, 730, 740, 735, and 745 are in the energized position. Since relay 730 is held energized through its upper winding, the normal energizing circuit of sending magnet S is retained open at contact 732. The abandonment causes relay 710 to restore for the last time and open the holding circuit of relay 720 at contact 712, causing relay 720 to restore after a short interval. The operating circuit to relay 725, however, cannot be completed at contact 711 since it is maintained open at contact 1019 and, therefore, relay 725 cannot re-operate.

The restoration of relay 720 opens the outgoing impulsing circuit at contact 721 to cause the release of incoming selector 500 and the restoration of relay 715. At contact 714, relay 720 opens the holding circuits of relays 1040 and 1045, causing these two relays to restore after a short interval. At contact 716, relay 715 opens the pulsating circuit of relay 1035, and relay 1035 restores for the last time. At contact 1036, relay 1035 opens the pulsating circuit of relay 1010, and relay 1010 re-establishes ground potential to the junction between the two windings of relay 710 at contact 1012 but relay 710 cannot re-operate at this time. At contact 1046, relay 1045 opens the holding circuit of relay 1050, causing relay 1050 to restore after a brief interval. At contact 1041, relay 1040 unlocks relay 1015, causing relay 1015 to restore and re-establish contact 711.

The restoration of relay 1040 also opens the holding circuit through the upper winding relay 730, and relay 730 restores shortly thereafter because ground potential by way of the displaced stop pin Z against which reset pin Y is resting, reset pin Y, contacts 758, 749 to the junction between the lower winding of relay 730 and coil 750 effectively short-circuits said lower winding. Relays 740 and 735 restore in turn, and the energizing circuit to sending magnet S is completed by way of contacts 732, 737 and 733.

The energization of sending magnet S opens contact 758, thereby removing the short-circuiting ground from the lower winding of relay 730, and relay 730 reoperates from ground potential by way of off-normal contact 755 and contact 727, thereby to open the energizing circuit of sending magnet S at contact 732. This de-energization of sending magnet S causes reset pin Y to restore the displaced stop pin Z against which it is resting thereby freeing disc 759 for rotation. Relay 730 also causes the re-operation of relay 740 at contact 731, and relay 740 in turn causes the re-operation of relay 735 at contact 717.

Reset pin Y is accordingly advanced to rest against the displaced stop pin Z which corresponds to the value of the registered third digit. Since a fourth digit is not registered, off-normal contact 755 opens as reset pin Y comes to rest against the displaced stop pin Z which corresponds to the value of the registered third digit, thereby opening the holding circuits of relays 745, 1030 and 730 and causing these three relays to restore. At contact 731, relay 730 opens the holding circuit of relay 740, and relay 740 opens the holding circuit of relay 735. Impulse regenerating unit 700 and its associated impulse regenerating device are now in normal condition.

The operator at switchboard 210 can, of course, abandon calls after having registered three or four digits in the impulse regenerating device, with the impulse regenerating device locked against regenerating three or four of the registered digits, as the case may be. It is considered, however, unnecessary to include explanatory details of such abandonments, in view of the descriptions of typical abandoned calls in the preceding section and in this section of the specification.

Considering now the case of an attempted call wherein the number of dialed impulses exceed the stop pin Z capacity of the impulses regenerating device of impulse regenerating unit 700, then flashing lamp supervision is returned to the calling operator to abandon the call. This flashing lamp supervision and the restoration of the occupied impulse regenerating device, are accomplished in the following described manner.

As lever 760 of disc X reaches the stop pin Z which is two pin positions short of the stop pin Z against which reset pin Y is now resting, off-normal contact 755 opens. The lever 760 of disc X is then prevented from rotating past the next stop pin Z which is just ahead of the said stop pin Z against which reset pin Y is resting, and when the impulsing of the dialed digit now being registered ceases, the de-energization of marking magnet M causes lever 760 of disc X to displace the stop pin Z with which lever 760 is now aligned. Reset pin Y is, therefore, now located between two adjacent displaced stop pins Z, which establishes an unstandard condition.

The opening of off-normal contact 755 unlocks relays 745 and 1030, relay 745 restoring quickly and relay 1030 after a short interval. Before relay 1030 restores, however, the circuit through the upper winding of differentially connected relay 1020 is opened at off-normal contact 755, and the circuit through the lower winding of relay 1020 by way of contact 1032 causes relay 1020 to operate. Relay 1020 then locks to ground potential on conductor 754′ by way of terminal 707 and contact 1022.

At contact 1024, relay 1020 disables contact 711 to prevent any further impulsing into the impulse regenerating device; at contact 1023, extends the circuit of relay 725 and receiving magnet R to the winding of relay 1055; and, at contact 1021, connects interrupted ground potential to relay 1010. Relay 1055 accordingly operates and relay 725 is maintained operated, but receiving magnet R cannot energize through the winding of relay 1055. At contact 1056, relay 1055 causes relay 1060 to operate. The operating circuits to relay 1025 and marking magnet M are again completed from ground on conductor 754′ by way of contacts 728 and 723, but relay 1025 and marking magnet M have no functions to perform at this time.

Relay 1010 follows the pulsing of the interrupted ground potential through contact 1021, thereby to transmit alternate battery and ground impulses by way of contacts 1011 and 1012, respectively, through terminal 701, lower winding of relay 710, terminal 742, wiper 842, contacts 823, 831, conductor C424, lower winding of supervisory relay R450 to battery or ground, as the case may be. The sole function of relay 710 under these conditions is to maintain relay 720 to hold the connection for the time being.

The alternate battery and ground impulses through the lower winding of relay 710 over conductor C424 causes the front supervisory lamp L266′ at the calling switchboard 210 to be flashed approximately 120 times per minute in a manner similar to that explained in Patent No. 2,500,392, to indicate that an abnormal (or unstandard) condition has been encountered on this call.

Since the impulse regenerating device of impulse regenerating unit 700 is now in an unstandard condition with certain stop pins Z displaced into the path of reset pin Y, it is necessary to effect its restoration to normal condition responsive to the calling operator at switchboard 210 abandoning the call. As relay 710 restores for the last time responsive to the abandonment, the holding circuit to relay 720 is opened at contact 712, and shortly thereafter relay 720 restores.

The restoration of relay 720 opens the outgoing impulsing circuit at contact 721; at contact 722, opens the circuit of relays 1055, 725 and receiving magnet R; and, at contact 723, opens the circuit to relay 1025 and marking magnet M. Relay 1055 restores quickly, opening the circuit of relay 1060 at contact 1056, at contact 1057, connecting ground potential to the junction between contact 719 and the lower winding of relay 740 by way of contact 1062 and terminal 713 before relay 1060 has had sufficient time to restore. Relay 725 restores shortly after relay 1055 restores, as does relay 1060.

At contact 729, relay 725 unlocks relay 1020, causing relay 1020 to restore after a short interval and open the pulsating circuit of relay 1010 at contact 1021 and also re-establish contact 711 of relay 710 at contact 1024. Relay 1010 re-establishes ground potential to the junction between the windings of relay 710, but relay 710 cannot re-operate at this time. At contact 726, relay 725 opens the holding circuit of relay 730, causing relay 730 to restore after a short interval.

The mentioned ground potential from relay 1055 energizes sending magnet S by way of contact 719 (relay 740 still being in the operated position because of relay 730 not having fully restored) and also short-circuits the upper winding of relay 740, thereby to cause relay 740 to restore and open the energizing circuit of sending magnet S at contact 719. The de-energization of sending magnet S causes reset pin Y to restore the displaced stop pin Z against which it is resting, and disc 759 thereupon advances reset pin Y into contact with the next displaced stop pin Z (which stop pin Z was displaced by the first registered digit and which registered digit is assumed to have consisted of two or more impulses). Responsive to the advancing of disc 759, off-normal contact 755 closes with the second step and causes relay 745 to re-operate by way of contact 756 and lock by way of contact 747. At contact 734, relay 745 replaces guarding ground on conductor 754′.

Relay 730 having restored completely is now re-operated from ground by way of off-normal contact 755 and contact 727. Relays 740 and 735 re-operate in turn, and the energizing circuit of sending magnet S is open at contact 732. As reset pin Y comes to rest against displaced stop pin Z corresponding to the first registered digit, the lower winding of relay 730 is short-circuited from ground by way of displaced stop pin Z corresponding to the first registered digit, reset pin Y and contacts 758 and 749, and relay 730 again restores after a short interval. At contact 731, relay 730 opens the holding circuit of relay 740, causing 740 to restore in turn and open the holding circuit of relay 735 at contact 717. As relay 735 restores, sending magnet S is energized from ground by way of contacts 732, 737 and 733.

The last mentioned energization of sending magnet S causes contact 758 to remove the short-circuiting ground from the lower winding of relay 730, and relay 730 re-operates from ground potential by way of off-normal contact 755 and contact 727. Relays 740 and 735 re-operate in turn, and the energizing circuit of sending magnet S is open at contact 732. Disc 759, therefore, advances reset pin Y to rest against the displaced stop pin Z corresponding to the second registered digit. From this point on, the restoration of the impulse regenerating device is completed in essentially the same manner as that explained in the preceding section of this specification for the call to substation T601.

In the preceding last-described attempted call, it was assumed that the first registered digit consisted of two or more impulses. Assuming now that the first registered digit in that attempted call consisted of only one impulse, then off-normal contact 755 does not close when disc 759 advances reset pin Y one step to cause reset pin Y to rest against the displaced stop pin Z corresponding to the first registered digit. The reason for the non-closure of off-normal contact 755 at this time is that two steps of reset pin Y are required to cause off-normal contact 755 to close.

As a result of the failure of off-normal contact 755 to close when reset pin Y comes to rest against the displaced stop pin Z corresponding to the first registered digit (registered by one impulse only), relays 745 and 730 cannot re-operate The momentary ground application by way of contacts 1057, 1062, terminal 713 to junction of contact 719 and the lower winding of relay 740, however, passes through contact 719 to energize sending magnet S and also to short circuit the upper winding of relay 740. Relay 740 restores and opens the energizing circuit of sending magnet S at contact 719. The de-energization of sending magnet S causes reset pin Y to restore the displaced stop pin Z against which it is resting, and disc 759 thereupon advances reset pin Y into contact with the displaced stop pin Z corresponding to the first registered digit. Since the advancement of reset pin Y is only one step, off-normal contact 755 cannot close, and relays 745 and 730, therefore, cannot re-operate.

The restoration of relay 740 also opens the holding circuit of relay 735 at contact 717, and relay 735 restores after a short interval. Before relay 735 restores, however, a circuit is completed from ground, contacts 732, 736, 718, 748, 724, lower winding of relay 740, winding of sending magnet S to battery, causing relay 740 to re-operate but not sending magnet S. At contact 719, relay 740 extends the ground potential directly to the winding of sending magnet S, causing sending magnet S to energize. The opening of contact 736 by the complete restoration of relay 735 causes the de-energization of sending magnet S and the restoration of re-operated relay 740.

The de-energization of sending magnet S causes reset pin to restore the displaced stop pin Z corresponding to the first registered digit, thereby freeing disc 759 for rotation. As reset pin Y accordingly advances towards the displaced stop pin Z corresponding to the second registered digit, off-normal contact 755 closes and completes the operating circuits to relays 745 and 730. From this point on, the complete restoration of the impulse regenerating device is accomplished in the manner previously explained.

*Regenerating network individual to a trunk—no delay in impulse re-transmission*

Figure 5:
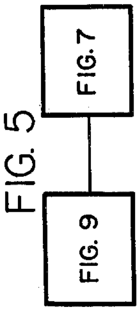
Figure 5 illustrates the method of combining Figures 7 and 9 to form a circuit combination wherein the present invention is made individual to one of the trunks of the polar duplex impulsing telephone system, and wherein the transmitting of the regenerated impulses is not delayed.

As previously indicated, Figure 5 of the present drawings shows that Figures 7 and 9 are combined together to form an impulse regenerating network which is made individual to one toll trunk of a polar duplex impulsing telephone system when the transmission of the regenerated impulses is not to be delayed.

Assuming now that such an impulse regenerating network is required for all the toll trunks of a polar duplex impulsing telephone system, then one switching-through relay equipment 900, as shown in Figure 9 of the present drawings, and one impulse regenerating unit 700, as shown in Figure 7 of the present drawings, are provided for each of the toll trunks 390 of the polar duplex impulsing telephone system.

The outgoing conductors C421, C422, C423 and C424 of each toll trunk repeater 400 of the polar duplex impulsing telephone system are connected to the respective incoming selector 500 of the toll trunk and to the respective switching-through relay group 900 of the associated regenerating network, and the incoming selector 500 of each toll trunk and the respective switching-through relay group 900 of the associated regenerating network are connected together, as shown at the left-hand end of Figure 9 of the present drawings. The terminals 941—944 of each switching-through relay group 900 are connected respectively to the terminals 741—744 of the associated impulse regenerating unit 700 by means of the dotted-line jumpers shown at the right-hand end of Figures 9 and 8 of the present drawings, the selector unit 800 and its wipers 841—844 being eliminated from consideration. In this manner, each toll trunk of the polar duplex impulsing telephone system is fitted with its individual switching-through relay group 900 and associated impulse regenerating unit 700.

Assuming further that the impulse regenerating network described in the preceding paragraph is applied to a call from switchboard 210 for substation T601, then battery potential is extended over conductor C424 through contact 911 (Figure 9), terminals 942, 742, lower winding of relay 710 to ground at terminal 701, causing relay 710 to operate. At contact 712, relay 710 completes an obvious operating circuit to relay 720.

At contact 714, operated relay 720 connects ground potential to conductor 754'. At contact 721, relay 720 completes a circuit from battery, coil 761, contacts 762, 764, 721, upper winding of relay 715 to ground on conductor 754', and a multiple circuit from battery, coil 761, contacts 762, 764, 721, lower winding of relay 715, conductor 753, terminals 743, 943, contact 913, conductor 914 to incoming selector 500 of Figure 5 of the drawings of Patent No. 2,500,392, contact 534, winding of impulse relay 540 to ground, causing relay R540 to operate. Relay 715 of Figure 7, however, does not operate at this time because its windings are differentially connected.

The dialing of the second digit of the directory number of called substation T601 at switchboard 210 causes this series of impulses to be registered in the impulse regenerating device of impulse regenerating unit 700 in the manner explained in the section of this specification titled "Regenerating network common to a group of trunks—no delay in impulse retransmission" and it is, therefore, unnecessary to repeat these details.

The details of the functioning of impulse regenerating unit 700 are fully described in the above-mentioned section of this specification and do not need repeating in this section. It is only necessary to read in conductor 914 in place of conductor 814, and to trace the circuit to incoming selector 500 through terminal 943 in place of terminal 843 and contact 913 in place of contact 824.

Responsive to the party at called substation T601 answering the call, battery potential is returned over conductor 914, contact 913, terminals 943, 743, conductor 753 to the lower winding of relay 715, causing relay 715 to operate in the manner described in the above-mentioned section of this specification. Relay 715 completes a circuit from ground, contact 716, terminals 705, 704, conductor 751, terminals 741, 941, contact 916, winding of relay 910 to battery, causing relay 910 to operate and lock to ground on conductor C423 through contact 915. At contact 912, relay 910 switches conductor C424 to conductor 914, thereby completely switching repeater 400 through to incoming selector 500. At contact 911, relay 910 disconnects conductor C424 from the lower winding of relay 710, causing relay 710 to restore. At contact 913, relay 910 disconnects conductor 914 from the lower winding of relay 715 and, at contact 917, disconnects conductor C423 from conductor 754'.

The restoration of relay 710 opens the circuit of relay 720 at contact 712, and relay 720 restores after a short interval. Relay 725 and receiving magnet R are operated from ground at contact 711 during the slow release period of relay 720. At contact 721, relay 720 opens the holding circuit through the upper winding of relay 715, and, at contact 722, opens the holding circuits of relay 725 and receiving magnet R. Relays 715, 725 and receiving magnet R restore accordingly, and relay 725 removes the last ground potential from conductor 754' at contact 729.

*Regenerating network individual to a trunk—Delay in impulse retransmission*

Figure 6:
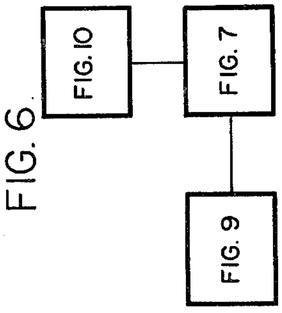
Figure 6 illustrates the method of combining Figures 7, 9 and 10 to form a circuit combination wherein the present invention is made individual to one of the trunks of the polar duplex telephone system, and wherein the transmitting of the regenerated impulses is delayed.

As previously indicated, Figure 6 of the present drawings shows that Figures 7, 9 and 10 are combined together to form an impulse regenerating network which is made individual to one toll trunk of a polar duplex impulsing telephone system, and wherein the transmission of regenerated impulses to the switch, or switches, ahead is delayed to provide additional trunk hunting time for the switch, or switches, ahead. In the present disclosure, however, the transmitting of regenerated impulses is prevented beyond the first switch ahead (incoming selector 500) when incoming selector 500 fails to find a free trunk outlet, and supervision is returned to the calling operator at switchboard 210 to abandon the attempted connection.

To combine Figures 7, 9 and 10 to form such an impulse regenerating network, the jumpers 768, 769 and 770 shown in Figure 7 are disconnected, the dotted line jumpers 771 are connected up instead, and the terminals 941—944 of Figure 9 are connected respectively to the terminals 741—744 of Figure 7.

Assuming now that such an impulse regenerating network is required for all the toll trunks of a polar duplex impulsing telephone system, then one switching-through relay equipment 900, as shown in Figure 9, one impulse regenerating unit 700, as shown in Figure 7, and one relay group 1000, as shown in Figure 10, are provided for each of the toll trunks 390 of the polar duplex impulsing telephone system.

The outgoing conductors C421—C424 of each toll trunk repeater 400 of the polar duplex impulsing telephone system are connected to the respective incoming selector 500 and to the respective switching-through relay group 900 of the associated regenerating network, and the incoming selector 500 of each toll trunk and the respective switching-through relay group 900 of the associated regenerating network are connected together, as shown at the left-hand end of Figure 9 of the present drawings. The selector unit 800 and its wipers 841—844 are eliminated from consideration. In this manner, each toll trunk of the polar duplex impulsing telephone system is fitted with its individual switching-through relay group 900 and associated impulse regenerating network 700 and relay group 1000.

Assuming further that the impulse regenerating network described in the preceding paragraph is applied to a call from switchboard 210 for substation T601, then battery potential is extended over conductor C424 through contact 911 (Figure 9), terminals 942, 742, lower winding of relay 710, terminal 701, contact 1012 to ground, causing relay 710 to operate. At contact 712, relay 710 completes an obvious operating circuit to relay 720.

At contact 714, operated relay 720 connects ground potential to conductor 754', and also completes a circuit to relay 1045 by way of terminal 707 and contact 1038, causing relay 1045 to operate. At contact 721, relay 720 completes a circuit from battery, coil 761, contacts 762, 764, 721, upper winding of relay 715 to ground on conductor 754', and a multiple circuit from battery, coil 761, contacts 762, 764, 721, lower winding of relay 715, conductor 753, terminals 743, 943, contact 913, conductor 914, to incoming selector 500 of Figure 5, contact 534, winding of impulse relay R540 to ground, causing relay R540 to operate. Relay 715 of Figure 7, however, does not operate at this time because its windings are differentially connected. At contact 1046, relay 1045 completes an obvious operating circuit to relay 1050, but operated relays 1045 and 1050 have no function at this time.

The dialing of the second digit at calling switchboard 210 causes this series of impulses to be registered in the impulse regenerating device of impulse regenerating unit 700 in the manner explained in the section of this specification titled "Regenerating Network Common to a Group of Trunks—Delay in Impulse Retransmission" and it is, therefore, unnecessary to repeat these details.

The details of the functioning of impulse regenerating unit 700 in combination with relay group 1000 are fully described in the above-mentioned section of this specification and do not need repeating in this section. It is only necessary to read in conductor 914 in place of conductor 814, and to trace the circuit to incoming selector 500 through terminal 943 in place of terminal 843 and contact 913 in place of contact 824.

Responsive to the party at called substation 601 answering the call, battery potential is returned over conductor 914, contact 913, terminals 943, 743, conductor 753 to the lower winding of relay 715, causing relay 715 to operate in the manner described in the above-mentioned section of this specification. Relay 715 operates relay 1035 by way of terminal 705. At contact 1038, relay 1030 opens the circuit of relay 1045, causing relay 1045 to restore after a short interval and open the circuit to relay 1050 at contact 1046. Relay 1050 in turn restores after a brief interval and closes contact 1051. A circuit for operating relay 910 is thereby completed from ground, contacts 1036, 1051, terminal 704, conductor 751, terminals 741, 941, contact 916, winding of relay 910 to battery, causing relay 910 to operate and lock to ground on conductor C423 through contact 915. At contact 912, relay 910 switches conductor C424 to conductor 914, thereby completely switching repeater 400 through to incoming selector 590. At contact 911, relay 910 disconnects conductor C424 from the lower winding of relay 710, causing relay 710 to restore. At contact 913, relay 910 disconnects conductor 914 from the lower winding of relay 715 and, at contact 917, disconnects conductor C423 from conductor 754'.

The restoration of relay 710 opens the circuit of relay 720 at contact 712, and relay 720 restores after a short interval. Relay 725 and receiving magnet R are operated from ground at contact 711 by way of terminal 703, contacts 1019, 1024 and terminal 702 during the slow release period of relay 720. At contact 721, relay 720 opens the holding circuit through the upper winding of relay 715; and at contact 722, opens the holding circuits of relay 725 and receiving magnet R. Relays 715, 725 and receiving magnet R restore accordingly. At contact 716, relay 715 opens the holding circuit of relay 1035, causing relay 1035 to restore. At contact 729, relay 725 removes the last ground potential from conductor 754'.

Having described the invention, what is considered new and is desired to have protected by Letters Patent is pointed out in the following claims.

What is claimed is:

1. In a telephone system, a calling station, a repeater terminating in a first trunk having talk, hold and control conductors, a second trunk having talk, hold and control conductors terminating in an automatic switch, said switch being adapted to respond to impulses of certain character and speed, an impulse regenerating unit having means for generating impulses of said certain character and speed, the talk and hold conductors of said first trunk being connected respectively to the talk and hold conductors of said second trunk, means for connecting the control conductor of said first trunk to said regenerating unit, a trunk line, means controlled from said calling station for seizing said repeater, means responsive to said seizure of said repeater for seizing said switch over the hold conductors of said first and second trunks, means responsive to said seizure of said repeater for seizing said regenerating unit over the control conductor of said first trunk, means responsive to said seizure of said regenerating unit for connecting said seized regenerating unit to the control conductor of said second trunk, means thereafter controlled from said calling station for transmitting impulses over the control conductor of said first trunk to cause said seized regenerating unit to generate corresponding impulses of said certain character and speed and to transmit said generated impulses of said certain character and speed over the control conductor of said second trunk, means in said seized switch responsive to said transmission of said generated impulses of said certain character and speed for operating said seized switch to select said trunk line, and means for completing a connection between said calling station and said selected trunk line over the talk conductors of said first and second trunks.

2. The telephone system claimed in claim 1 together with means effective after said regenerating unit has completed its functions for switching the control conductor of said first trunk from said seized regenerating unit to the control conductor of said second trunk, and means for completing a connection over the control conductor of said first and second trunks from said calling station to said selected trunk line.

3. The telephone system claimed in claim 1 together with means effective after said seized regenerating unit has completed its functions for switching the control conductor of said first trunk from said seized regenerating unit to the control conductor of said second trunk, means for completing a connection between said calling station and said selected trunk line over the control conductors of said first and second trunks, and means responsive to said switching of the control conductor of said first trunk for causing the restoration of said operated regenerating unit.

4. In a telephone system as claimed in claim 1 wherein there are a plurality of impulse regenerating units accessible to said repeater, and means including the control conductor of said first trunk for selecting and seizing an idle one of said plurality of regenerating units.

5. In a telephone system as claimed in claim 1 wherein there are a plurality of impulse regenerating units accessible to said repeater, together with means including the control conductor of said first trunk for selecting and seizing an idle one of said regenerating units, and means effective after said seized regenerating unit has completed its functions for causing the release of said operated regenerating unit and for connecting the control conductor of said first trunk to the control conductor of said second trunk.

6. The telephone system claimed in claim 1 together with means responsive to a supervisory control on said selected trunk line for returning a supervisory signal over the control conductor of said second trunk, and means responsive to said supervisory signal over the control conductor of said second trunk for disconnecting the control conductor of said second trunk from said seized regenerating unit and for switching the control conductors of said first and second trunk together.

7. The telephone system claimed in claim 6 and means for returning a supervisory signal over the control conductors of said second and first trunks to said calling station.

8. In a telephone system, a calling station, an automatic switch adapted for responding to impulses of certain character and speed, an impulse regenerating unit having a control conductor and means for regenerating impulses of said certain character and speed, a repeater having talk, hold and control conductors, the talk and hold conductors of said repeater terminating in said switch, means for connecting the control conductor of said repeater to said regenerating unit, means controlled by said calling station for seizing said repeater, means responsive to said seizure of said repeater for seizing said switch over the hold conductor of said seized repeater, means responsive to said seizure of said repeater for seizing said regenerating unit over the control conductor of said seized repeater, means responsive to said seizure of said regenerating unit for connecting the control conductor of said seized regenerating unit to said seized switch, thereby to condition said seized switch for operation by impulses receivable from said seized regenerating unit over the control conductor of said seized regenerating unit, means thereafter controllable by said calling station for transmitting impulses over the control conductor of said seized repeater to cause said seized regenerating unit to generate corresponding impulses of said certain character and speed, said calling station abandoning the call without causing impulses to be transmitted over the control conductor of said seized repeater, means responsive to said abandonment for disabling the hold conductor of said seized repeater to prepare said conditioned switch for restoration, means responsive to said abandonment for disabling said control conductor of said seized repeater, and means responsive to said disablement of said conductor of said seized repeater for disconnecting the control conductor of said seized regenerating unit from said conditioned switch to cause the restoration of said conditioned switch.

9. The telephone system claimed in claim 8 together with means for operating said seized regenerating unit to condition its generating means for generating an impulse of said character and speed, means for operating said conditioned generating means to generate an impulse of said certain character and speed and to discharge said generated impulse into said disconnected control conductor of said operated regenerating unit, thereby to restore said operated generating means to normal condition, and means for restoring said operated regenerating unit to normal condition.

10. In a telephone system, a calling station, a first automatic switch, other automatic switches each accessible to said first switch, all said switches adapted to respond to impulses of certain character and speed, means for busying all said other switches against seizure by said first switch, an impulse regenerating unit having a control conductor terminating in said first switch, said regenerating unit also having means for generating impulses of said certain character and speed, a repeater having a control conductor terminating in said regenerating unit, means for extending said calling station to said repeater, means thereafter controlled by said calling station for transmitting a first and a second series of impulses over the control conductor of said repeater, means for registering said two transmitted series of impulses in said regenerating unit, means responsive to the registration of said first series of impulses for causing said regenerating unit to generate and transmit a corresponding series of impulses of said certain character and speed over the control conductor of said regenerating unit, means responsive to said transmission of said last generated series of impulses for causing said first switch to progressively test said busy other switches, means responsive to said first switch testing the last busy other switch for causing said first switch to connect with an all-switch-busy position, means responsive to said first switch connecting with said all-switch-busy position for causing said operated first switch to return a supervisory signal over the control conductor of said regenerating unit, and means responsive to said returned supervisory signal for preventing said regenerating unit from generating a series of impulses of said certain character and speed corresponding to said registered second series of impulses.

11. The telephone system claimed in claim 10 together with means responsive to said returned supervisory signal for extending a supervisory signal over the control conductor of said repeater to said calling station.

12. The telephone system claimed in claim 11 together with means thereafter controlled by said calling station for abandoning the call, means responsive to said abandonment for opening the control conductor of said regenerating unit, and means responsive to said abandonment for causing said regenerating unit to generate a series of impulses corresponding to said registered second series of impulses and to discharge said last mentioned generated series of impulses into said open control conductor of said regenerating unit, thereby to restore said regenerating unit to normal.

13. In a telephone system, a calling station, a first automatic switch, a second automatic switch accessible to said first switch, a plurality of third automatic switches each accessible to said second switch, all said switches adapted to respond to impulses of certain character and speed, means for busying all said third switches against seizure by said second switch, an impulse regenerating unit having a control conductor terminating in said first switch, said regenerating unit also having means for generating impulses of said certain character and speed, a repeater having a control conductor terminating in said regenerating unit, means for extending said calling station to said repeater, means thereafter controlled by said calling station for transmitting first, second and third series of impulses over the control conductor of said repeater, means for registering said three transmitted series of impulses in said regenerating unit, means responsive to the registration of said first series of impulses for causing said regenerating unit to generate and transmit a corresponding series of impulses of said certain character and speed over the control conductor of said regenerating unit, means responsive to said transmission of said last generated series of impulses for operating said first switch to seize said second switch, means responsive to said transmission of said last generated series of impulses for causing said regenerating unit to generate and transmit another series of impulses of said certain character and speed over the control conductor of said regenerating unit, each other generated series of impulses corresponding to said registered second series of impulses, means responsive to said transmission of said other generated series of impulses over the control conductor of said regenerating unit and over said operated first switch for causing said second switch to progressively test said busy third switches, means responsive to said second switch testing the last busy third switch for causing said second switch to connect with an all-switch-busy position, means responsive to said second switch connecting with said all-switch-busy position for causing said operated second switch to transmit a supervisory signal over said operated first switch and the control conductor of said regenerating unit, and means responsive to said transmission of said supervisory signal for locking said regenerating unit against generating a series of impulses of said certain character and speed corresponding to said registered third series of impulses.

14. In a polar duplex impulsing telephone system including a repeater connected to a succeeding automatic switch over a trunk having line, hold and control conductors, a calling station, an impulse regenerating unit, said control conductor being divided into two sections and said regenerating unit being interposed between said repeater and said switch by means of said two sections of said control conductor, means for connecting said calling station to said repeater, means for intercepting series of impulses controlled from said calling station over the section of said control conductor extending from said repeater to said regenerating unit, means for registering said intercepted series of impulses in said regenerating unit, said regenerating unit having a fixed capacity for registering impulses, means responsive to the registration of the first intercepted series of impulses for causing said regenerating unit to generate a corresponding series of impulses and to transmit said last generated series of impulses into the section of said control conductor extending from said regenerating unit to said switch, means in said switch responsive to said transmission of said last generated series of impulses for operating said switch, means responsive to said operation of said switch for returning a supervisory signal to said regenerating unit over the section of said control conductor connecting said switch and said regenerating unit, means responsive to said transmission of said supervisory signal for locking said regenerating unit against generating and transmitting further series of impulses corresponding to other series of impulses registered in said regenerating unit, said locking of said regenerating unit occurring before all of the succeeding intercepted series of impulses have been registered in said regenerating unit, the number of impulses in the last intercepted series of impulses exceeding the remaining impulse registration capacity of said regenerating unit thereby making it impossible to register all the impulses of said last intercepted series of impulses, means responsive to said partial registration of said last intercepted series of impulses for causing an unstandard conditioning of said regenerating unit, means responsive to said unstandard conditioning of said regenerating unit for causing a supervisory signal to be returned to said calling station over the section of said control conductor connecting said regenerating unit and said repeater, thereby to identify said unstandard condition of said regenerating unit at said calling station, said calling station thereupon abandoning the attempted call, and means responsive to said abandonment for causing the release of said attempted call and the restoration of said regenerating unit to normal condition.

15. In a polar duplex impulsing telephone system including a repeater connected to a succeeding automatic switch over a trunk having talk hold and control conductors, said switch being adapted to respond to impulses of certain character and speed, an impulse regenerating unit having means for regenerating impulses of said certain character and speed, said control conductor being divided into two sections for interposing said regenerating unit between said repeater and said switch, means for intercepting impulses transmitted into the section of said control conductor extending from said repeater to said regenerating unit, said intercepted impulses having improper characteristics for correctly operating said switch without regeneration, means for registering said intercepted impulses in said regenerating unit, means responsive to said registration for causing said regenerating unit to generate corresponding impulses of said certain character and speed and to transmit such generated impulses into the section of said control conductor extending from said regenerating unit and terminating in said switch, thereby to operate said switch according to the value of said generated impulses, and means for thereafter switching the section of the control conductor extending from said repeater directly to the section of the control conductor terminating in said switch and for disconnecting said regenerating unit from both sections of the control conductor.

JOHN WICKS.

REFERENCES CITED

The following references are of record in the file of this patent:

UNITED STATES PATENTS

| Number | Name | Date |
|---|---|---|
| 2,154,776 | Saville | Apr. 18, 1939 |